United States Patent [19]

Dorman et al.

[11] Patent Number: 5,133,920
[45] Date of Patent: Jul. 28, 1992

[54] METHOD FOR FORMING COMPOSITE SIMULATED IVORY MATERIALS

[75] Inventors: Linneaus C. Dorman; John A. Rice, both of Midland, Mich.

[73] Assignee: The Dow Chemical Company, Midland, Mich.

[21] Appl. No.: 674,817

[22] Filed: Mar. 25, 1991

[51] Int. Cl.$^5$ .............................................. B29C 43/14
[52] U.S. Cl. ..................................... 264/241; 264/120; 264/162; 264/294; 264/313; 264/347; 425/405.2; 623/16
[58] Field of Search ................... 264/73, 77, 109, 112, 264/122, 320, 325, 245, 313, 241, 120, 162, 294, 347; 425/405.1, 405.2; 623/16, 22; 527/202

[56] References Cited

U.S. PATENT DOCUMENTS

| | | | |
|---|---|---|---|
| 3,450,808 | 6/1969 | Roberts | 264/122 |
| 3,562,379 | 2/1971 | Duggins | 264/171 |
| 3,670,060 | 6/1972 | Cuffaro et al. | 264/122 |
| 3,836,619 | 9/1974 | Volent | 264/313 |
| 4,102,966 | 7/1978 | Duperray et al. | 264/113 |
| 4,508,575 | 4/1985 | Oshima | 264/77 |
| 4,636,526 | 1/1987 | Dorman et al. | 623/16 |
| 4,842,604 | 6/1989 | Dorman et al. | 623/16 |

*Primary Examiner*—Jeffery Thurlow
*Assistant Examiner*—Mathieu Vargot

[57] ABSTRACT

A family of composite materials consisting of a mineral filler and a synthetic polymer are provided which are characterized by properties similar to natural ivory. The ivory-like composite material contains about 25 to about 75 percent by weight of the mineral filler, preferably a calcium phosphate. In addition, the composite material contains about 75 to about 25 percent by weight of the polyamino acid, preferably an α-amino acid such as poly(gamma-methyl L-glutamate). The composite material is formed using in situ polymerization techniques, thereby ensuring intimate and homogeneous blending of the mineral and polymer phases as well as facile preparation at ambient temperatures. In addition, the ivory-like composite material is molded using an isostatic compression molding technique. The composite material may be molded to form virtually any desired shape for decorative or practical purposes, or for subsequent carving. The resulting ivory-like composite materials are characterized by properties similar to natural ivory.

11 Claims, No Drawings

METHOD FOR FORMING COMPOSITE SIMULATED IVORY MATERIALS

TECHNICAL FIELD

The present invention relates to composite materials which simulate natural ivory in their appearance and physical properties, and a method for forming such materials. More particularly, this invention relates to ivory-like composite materials consisting of synthetic polymers, such as polyamino acids, and a mineral filler, such as calcium phosphate, which may be formed from an in-situ polymerization process.

BACKGROUND OF THE INVENTION

Natural ivory is a material prized by many because of its distinguishing characteristics. It is relatively soft and characterized by a unique striped coloring which ages distinctively. The ivory may be carved and polished so as to form smooth decorative surfaces. Natural ivory also has a relatively high thermal conductivity, such that it remains cool to the touch. Further, it is a porous material, capable of absorbing liquids. These last two features are especially desirable for concert pianists and other musical performers, whom require cool, dry instrument keys even after long periods of heated, sweaty contact with the keys during performances.

However, the source for natural ivory, elephant tusks, is becoming increasingly more scarce and therefore difficult to obtain. Firstly, the world-wide population of elephants is rapidly diminishing due to the widespread killing of these elephants by poachers in search of the prized and valuable ivory tusks Secondly, many countries have banned the import of natural ivory, even if legally obtained, in hopes of curtailing the illegal poaching. It is clear that a substitute for the natural ivory is needed which simulates the desired characteristics of natural ivory, so as to eliminate the needless killing of the elephants while also providing an adequate substitute for the many items of commerce which require natural ivory.

Many substitutes have been proposed by the art to replace natural ivory. The prior art teaches that artificial ivory or ivory-like substances may be prepared from mineral fillers and various types of polymers. U.S. Pat. No. 4,508,575 to Oshima is an exemplary disclosure of an artificial ivory formed from a natural type polymer, like the protein casein, with a mineral filler. U.S. Pat. No. 3,443,261 to Battista et al. illustratively discloses the use of collagen, another natural type polymer, with a mineral filler for the formation of an ivory substitute. Lastly, cellulose, still another natural type polymer, has been used to make ivory-like piano keys, as disclosed in U.S. Pat. No. 4,840,104 to Ishida et al. Mineral fillers have also been used with other materials, such as nylon, plasticized amino resins, polyester resins and others, to form an ivory-like substitute. In addition, ivory-like substitutes have been formed using various ceramics without the addition of any other type of filler, and also various polymers acting alone.

As can be seen by the prior art, many attempts have been made to form a suitable ivory-like substitute. However, even though the prior art teaches the use of natural polymers, particularly the proteins, with a mineral filler for formation of an ivory substitute, there is no mention by the prior art of polyamino acids with a mineral filler for the formation of an ivory-like material. Rather, this combination of materials, the polyamino acids and mineral fillers, has been taught for bone prothesis. Composite materials for bone prosthetics, which utilize polyamino acids with a mineral filler, are disclosed in U.S. Pat. No. 4,192,021 to Deibig et al. and U.S. Pat. Nos. 4,636,526, 4,698,375 and 4,842,604 to Dorman et al. These references all disclose the use of polyamino acids with mineral fillers, but for the preparation of bone-replacement prosthetic materials. These prosthetic materials are characterized by relatively high porosity, wherein the individual pores are also relatively large, and a high degree of biodegradability. Both of these features are required for bone prosthetics so as to promote and ensure tissue regrowth when the prosthetic is surgically implanted into a body.

Since bone and ivory share similar properties and common ingredients, namely collagen and hydroxyapatite, it would seem that the bone prosthetic material should have physical properties similar to a simulated ivory material. However, this is not the case. As stated above, bone prosthetics require a certain degree of porosity to function satisfactorily within the body. Porosity is not necessarily desirable within an ivory substitute, since the porosity would detract from the natural beauty of the ivory and would also make carving or other shaping of the ivory-like material more difficult. Therefore, even though they have a similar chemical make-up, in actuality, the bone prosthetics and the ivory-like materials are differentiated in nature and in their application. As an illustrative example, the present shortage of elephant ivory is not assuaged by the abundance of animal bones from animals of commerce.

Therefore, even though composite materials utilizing a mineral filler and polyamino acids may be utilized in the bone prosthetics art, these materials are characterized by properties which are substantially different than natural ivory and therefore are not suitable replacements for natural ivory. Accordingly, it would be desirable to provide a suitable replacement for natural ivory, such as wherein the replacement material is a composite consisting of a polyamino acid and a mineral filler. Further, it is desirable that such a composite material be manufactured without undue effort or difficulties, such as by using a facile, in-situ preparation method.

SUMMARY OF THE INVENTION

It is an object of this invention to provide a composite material which is characterized by ivory-like properties and accordingly which is a suitable replacement for natural ivory.

It is a further object of this invention that such composite material be formed from a polyamino acid and a mineral filler.

It is still a further object of this invention that such a composite material be formed using in-situ preparation techniques.

In accordance with a preferred embodiment of this invention, these and other objects and advantages are accomplished as follows.

The present invention is directed to a family of composite materials consisting of a mineral filler and a synthetic polymer. The composite materials are characterized by properties similar to natural ivory. The ivory-like composite material contains about 25 to about 75 percent by weight of the mineral filler, preferably about 50 weight percent of a calcium phosphate. In addition, the composite material contains about 75 to about 25 percent by weight of the polyamino acid, preferably about 50 weight percent of an α-amino acid such as poly(gamma-methyl L-glutamate).

An inventive feature of the present invention is that the composite material is formed using in situ polymerization techniques, thereby ensuring intimate and homogeneous blending of the mineral and polymer phases as well as facile preparation at ambient temperatures. In addition, the ivory-like composite material is molded using an isostatic compression molding technique. The composite material may be molded to form virtually any desired shape for decorative or practical purposes, or for subsequent carving. The resulting ivory-like composite materials are characterized by properties similar to natural ivory and with pore sizes of no greater than about 100 micrometers.

Other objects and advantages of this invention will be better appreciated from a detailed description thereof, which follows.

DETAILED DESCRIPTION OF THE INVENTION

A family of ivory-like composite materials are provided which are composed of polyamino acids and mineral fillers. These composites are formed using an in-situ polymerization technique and may be molded using isostatic compression molding techniques. The α-amino acids utilized in the preparation of the preferred composite materials of the present invention may be any of the common, naturally occurring or synthetic α-amino acids. Preferred are those α-amino acids capable of undergoing polymerization through the corresponding reactive α-amino acid N-carboxyanhydride monomer (for convenience hereinafter referred to as α-amino acid NCA).

Examples of the α-amino acids which can be used for preparation of the preferred composites include compounds such as aspartic acid, glutamic acid, lysine, arginine, alanine, valine, leucine, serine and the like. The α-amino acids used herein may be present in the D or L configuration or in the D,L configuration. Preferred are those α-amino acids exhibiting the L configuration.

It is necessary to ensure that during the α-amino acid NCA polymerization, no side chain reactions or interactions between amino and carboxyl functions of different amino acids occur. Such situations may be prevented by carrying out the reaction in such a way so as to avoid these interactions or by using α-amino acids wherein protecting groups have been added to the side chain, amino and/or carboxyl functions. Amino acids having such protected functionalities are readily prepared by known techniques or are commercially available See for example the following publications *Solid Phase Peptide Synthesis*, J. Stewart and J. Young, W. H. Freeman and Co., San Francisco, 1969; *Synthetic Peptides*, G. Pettit, Vol. 1 (1970) and Vol. 2 (1971), Von Nostrand Reinhold Co., New York; and *The Peptides, Analysis, Synthesis, Biology*, E. Gross and J. Meienhofer, Academic Press, New York, 1979.

Of the α-amino acids which may be used in this invention, glutamic acid is preferred. Glutamic acid may be polymerized by known techniques without the addition of the above-described protecting groups, or alternatively derivatives of glutamic acid may be used. Especially preferred for use herein are the gamma-ester derivatives of glutamic acid of the formula:

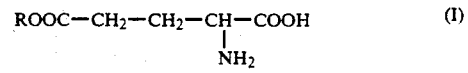

wherein R represents alkyl or aralkyl. As used herein, the term "alkyl" refers to aliphatic, straight or branched chain radicals of from about 1 to about 10 carbon atoms or cyclic aliphatic radicals of from about 3 to about 8 carbon atoms; "aralkyl" refers to radicals such as, for example, phenylethyl, benzyl, ring-substituted benzyl and the like. Most particularly preferred for use here are those compounds of formula I wherein R is methyl or benzyl.

The α-amino acid NCA referred to above is prepared by the reaction of the desired α-amino acid with phosgene via procedures known to the art. Illustrative examples of these procedures are U.S. Pat. No. 3,658,831 and Fuller et al., "A Procedure for the Facile Synthesis of Amino-Acid N-Carboxyanhydrides" (*Bipolymers*, Vol. 15, p. 1869, 1976) which are incorporated herein by reference. For purposes of illustration, the N-carboxyanhydride of a compound of Formula I is prepared by the following reaction sequence (where R is as defined for Formula I):

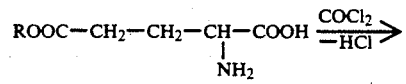

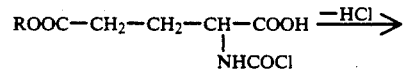

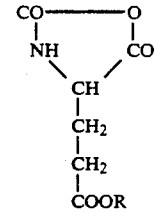

The α-amino acid is then readily polymerized into the α-amino acid polymer as represented by the following:

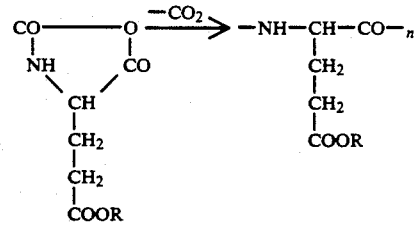

wherein R is as defined for formula I and n is a positive integer. The other α-amino acid polymers alluded to herein may be prepared in a manner analogous to the above-described reactions; the use of compounds of Formula I is merely illustrative. Further, one skilled in the art will appreciate that α-amino acid polymers may be prepared by techniques other than as described herein (i.e., by methods other than polymerization of an α-amino acid NCA monomer) such as by the use of active esters or triphenylphosphite with imidazole and the like.

In preparing the composites of this invention, the synthetic polymer can be pre-polymerized and mixed with powdered unsintered calcium phosphate or the composite can be prepared by impregnating pre-formed unsintered calcium phosphate with monomer, prepolymer or polymer followed by polymerization if necessary. The most preferred method of preparing the composites of this invention is in situ polymerization of the monomer in the presence of the powdered unsintered calcium phosphate. Alternatively, sintered calcium phosphate may also be utilized with satisfactory results obtained.

Satisfactory results have also been obtained using other mineral fillers, such as barium titanate ($BaTiO_3$), magnesium aluminum hydroxide ($MgAl_2(OH)_8$ and alumina ($Al_2O_3$). These alternative mineral fillers would be processed and the resulting ivory-like composite material formed using techniques similar to that described above for the calcium phosphate, incorporating appropriate modifications known to the art.

The calcium phosphates of the composites of this invention may be one or more unsintered or sintered calcium phosphates such as, for example, calcium phosphate tribasic ($Ca_{10}(OH)_2(PO_4)_6$) also known as hydroxyapatite or simply apatite; tricalcium phosphate ($Ca_3(PO_4)_2$); or various calcium pyrophosphates. The composite materials may contain from about 25 to about 75 percent by weight, preferably from about 40 to about 60 percent by weight, of one or more of the calcium phosphate materials, preferably unsintered hydroxyapatite, unsintered tricalcium phosphate or mixtures thereof. Alternatively, calcium phosphate which has previously been sintered, may also be utilized as a starting material with satisfactory results obtained.

In the composites containing $\alpha$-amino acid polymers, various combinations of $\alpha$-amino acids may be polymerized with one or more calcium phosphate biomaterials. By so doing, the characteristics of the resulting composite material may be modified so as to vary the physical properties of the resulting ivory-like composite, thus allowing one skilled in the art to design a given composite for highly specific applications.

In the in situ preparation of the preferred composite materials containing $\alpha$-amino acid polymers, the desired $\alpha$-amino acid (having, if necessary, protected side chain, amino and/or carboxyl functionalities) is treated with phosgene to from the reactive $\alpha$-amino acid NCA monomer. While various phosgenation processes are known to the art, it is preferable that a process substantially the same as that described in U.S. Pat. No. 3,658,831 be utilized in order to prepare an $\alpha$-amino NCA of the desired purity. It is important to obtain very highly pure $\alpha$-amino acid NCA in order to prepare $\alpha$-amino acid polymers having a high degree of polymerization and high quality. The $\alpha$-amino acid NCA thus obtained is then admixed with one or more of the desired calcium phosphate materials in a suitable inert organic solvent such as chloroform, dioxane, tetrahydrofuran (THF), methylene chloride or mixtures thereof. Preferably, the inert organic solvent utilized is dioxane, THF, or mixtures thereof. For in situ polymerization the calcium phosphate material must be in a powdered or particulate form. Typically the calcium phosphate particles are between about 0.05 micrometers ($\mu m$) and 10 $\mu m$ in diameter and preferably about 1 $\mu m$ in diameter. As noted earlier, the composite material may be composed of from about 25 to about 75 percent by weight preferably from about 40 to about 60 percent by weight of one or more calcium phosphate materials, preferably unsintered hydroxyapatite, unsintered tricalcium phosphate, or mixtures thereof. Correspondingly, the $\alpha$-amino acid polymer represents from about 75 to about 25 percent by weight, preferably from about 60 to about 40 percent by weight of the composite formed. Typically, the $\alpha$-amino acid NCA and calcium phosphate material mixture is stirred for a period of time sufficient to effect formation of the desired composite material (usually from about 2 to about 12 days) at a temperature of from about 18° C. to about 30° C. It is preferred that the mixture be stirred for about 3 to about 6 days at ambient temperature and pressure.

Notably, the above-described in situ polymerization of the $\alpha$-amino acid NCA and calcium phosphate material proceeds spontaneously at ambient temperature without the need for initiators. Further, it is unnecessary to use a solvent system in which both the $\alpha$-amino acid NCA monomer and resultant $\alpha$-amino acid polymer are soluble. For example, poly(gamma-methyl)-L-glutamate is insoluble in dioxane or THF, two solvents frequently used for the polymerization. The in situ polymerization process of the preferred composite materials results in an intimate bonding between the resulting $\alpha$-amino acid polymer and unsintered calcium phosphate material, not merely a mixture of these components.

Once the preferred composite material has been prepared by the in situ method, it can be molded to virtually any desired shaped while maintaining the complete integrity of the composite material. Therefore, one skilled in the art could mold any desired shape of this ivory-like material, whether for practical or decorative purposes.

The following examples are provided as a means of illustrating the present invention and are not to be construed as a limitation thereof.

EXAMPLES

The preferred $\alpha$-amino acid polymers were formed using techniques known in the art, see specifically Examples 1 through 7 of U.S. Pat. No. 4,636,526 which is incorporated herein by reference. Those preferred $\alpha$-amino acid polymers are gamma-Benzyl L-Glutamate; gamma-Benzyl D,L-Glutamate; gamma-Hexyl L-Glutamate; gamma-Methyl L-Glutamate; gamma-Methyl D,L-Glutamate; gamma-Benzyl L-Glutamate N-Carboxyanhydride; and gamma-Methyl L-Glutamate N-Carboxyanhydride.

EXAMPLE 8

Hydroxyapatite-Poly(gamma-Methyl L-Glutamate) Composite 5.0 g of gamma-methyl L-glutamate N-carboxyanhydride was added to 50 ml of a mixture of dioxane-THF (3:1). Upon solubilization, 5.9 g of dry unsintered calcium phosphate tribasic (i.e., hydroxyapatite) was added and the mixture was stirred at room temperature for seven days. The mixture was then poured with stirring into 300 ml of methanol and the product composite was collected by filtration, washed with methanol and dried in vacuo at 80° C. for 6 hours. 9.58 g of a soft, white, homogeneous solid was obtained and subsequently identified as hydroxyapatite-poly(gamma-methyl L-glutamate) composite consisting of 61% (by weight) hydroxyapatite. This composite material was easily ground to a fine powder.

EXAMPLE 9

Hydroxyapatite-Poly(gamma-Methyl L-Glutamate) Composite

Following a procedure substantially the same as that described in Example 8, 65.2 g of gamma-methyl L-glutamate N-carboxyanhydride, 50 g of unsintered hydroxyapatite and 675 ml of a mixture of dioxane-THF (3:1) were stirred continuously for 5 days. Two liters of methanol were then added to the mixture and the desired composite material was recovered as described in Example 1. 98 g of the desired hydroxyapatitepoly(-gamma-methyl L-glutamate) composite material consisting of 50% (by weight) hydroxyapatite was subsequently recovered.

EXAMPLE 20

Hydroxyapatite-Poly(gamma-Benzyl L-Glutamate Composite 72.6 g of gamma-benzyl L-glutamate N-carboxyanhydride, 40 g of unsintered hydroxyapatite, and 700 ml of a mixture of dioxane-THF (3:1) were continuously stirred for four days. The reaction mixture was then poured with stirring into 2500 ml of ethanol and collected by filtration. The residue from the filtration was washed with ethanol, air dried and then dried in vacuo at 60°-70° C. for six hours. 98 g of the desired hydroxyapatite-poly(gamma-benzyl L-glutamate) composite material (60 percent by weight hydroxyapatite) was obtained as a white, short fiber-like solid.

EXAMPLE 11

Isostatic Compression Molding of Poly (gamma-Methyl L-Glutamate)/Calcium Phosphate (50:50 wt %) Composite Molds for green state formation were constructed from rubber. A urethane rubber mold, 12 mm diameter (outer diameter 25 mm)×45 mm depth inner diameter, was charged with 2 g of powdered composite (poly(-gamma-methyl L-glutamate)/ calcium phosphate (50:50 wt %), then closed with a form-fitting piston-like cap, the piston of which extended about 20 mm into the chamber giving an inner column of powder, ≈27 mm, which compressed in place. The filled mold was then wrapped tightly and tied with rubberized tape while the cap was held snugly in place. The mold was then placed in an Autoclave Engineers cold isostatic press and pressurized to 44,000 psi for several minutes at room temperature while suspended in an oil/water emulsion. The now smaller green state compacted piece was recovered and then sealed in a cocoon of silicone (Dow Corning RTV Sealant 732). This was achieved by applying a layer (¢2-4 mm) of silicone to tissue paper and then surrounding the green state composite piece with the silicone side. The fully coated piece was placed in a hood for curing of the silicone. When the silicone was cured, the coated green state composite piece was placed in a graphite dish and lowered into a graphite chamber of an Asea hot isostatic press, model QIH9. Excess space in the chamber was filled with pieces of graphite. The chamber was sealed and the composite piece was pressurized with nitrogen gas, and heated, such that a maximum pressure of 29,800 psi was achieved at a maximum temperature of 220° C., which was sustained for about 10 minutes. Pressurization was reduced slowly while the chamber was cooled. After removal of the silicone cocoon and removal of residual silicone by rubbing with a toluene-soaked cloth, the recovered molded piece was about 9.5 mm in diameter×20 mm. The molded piece could be further cleaned with fine-grit sand paper or emery cloth to result in a clean, white, smoothly polished ivory-like material.

EXAMPLE 12

Isostatic Compression Molding of Poly (gamma-Methyl L-Glutamate)/Calcium Phosphate (50:50 wt %) Composite Following a procedure substantially the same as that described in Example 11, the following ivory-like composite was also prepared.

Another mold, 30 mm diameter inner diameter (outer diameter 20 mm)×50 mm depth and closed at one end with a no. 7 size rubber stopper, was charged with 9 g of composite powder. The open end was stopped giving a net inner column height of approximately 27 mm. After removal of the silicon cocoon and removal of residual silicone by rubbing with a toluene-soaked cloth, the recovered molded piece was about 21 mm in diameter×15 mm. Again, the composite piece could be further cleaned with fine-grit sand paper or emery cloth to produce a clean, white, smoothly polished ivory-like material.

With this isostatic compression method for molding the composite material, the resulting material is dense and exhibits very little porosity Further, the individual pores are presumably very fine in size, much smaller than the comparable composite materials used for bone prosthetics which are characterized by pore sizes greater than about 100 micrometers diameter. The ivory-like composite materials were characterized by an ivory-like appearance in color and texture. The ivory-like composite materials may be molded into practically any desired shape, and may be subsequently carved. Therefore these composite materials may be used for useful and decorative purposes, such as for jewelry, items of art, or carved personal seals for use in the Orient.

This invention readily facilitates the facile manufacture of an ivory-like composite material, wherein the materials utilized may be easily modified to adapt to a given application. Therefore while our invention has been described in terms of preferred embodiments, it is apparent that other forms could be adopted by one skilled in the art, such as by substituting other appropriate polymers or mineral fillers, or by varying the processing and manufacturing parameters. Accordingly the scope of our invention is to be limited only by the following claims.

What is claimed is:

1. A method for forming an ivory-like molded material suitable for decorative purposes comprising the following steps:
   providing a flexible container filled with a predetermined amount of a poly(amino acid)/mineral filled composite material consisting essentially of from about 25 to about 75 percent by weight of a mineral filler essentially uniformly dispersed within about 75 to about 25 percent by weight of a polyamino acid, the composite formed through an in-situ polymerization of amino acids on the mineral filler;
   isostatically pressurizing said poly(amino acid)/mineral filled composite material within said flexible container at a first pressure and first temperature sufficient to produce a compacted green mold of said composite material; and isostatically pressurizing said green mold at a second pressure and second temperature which is greater than said first temperature, sufficient to produce ivory-like molded pieces.

2. A method for forming an ivory-like molded material as recited in claim 1 wherein said ivory-like molded pieces have pore sizes of no greater than about 100 micrometers.

3. A method for forming an ivory-like molded material as recited in claim 1 wherein said mineral filler is chosen from the group consisting of calcium phosphate, barium titanate, magnesium aluminum hydroxide, and alumina.

4. A method for forming an ivory-like molded material as recited in claim 1 wherein said mineral filler is hydroxyapatite or tricalcium phosphate.

5. A method for forming an ivory-like molded material as recited in claim 1 wherein said polyamino acid is an α-amino acid polymer.

6. A method for forming an ivory-like molded material as recited in claim 1 wherein said polyamino acid is a gamma-methyl L-glutamate polymer.

7. A method for forming an ivory-like molded material as recited in claim 1 wherein said mineral filler is about 40 to about 60 percent by weight of said composite material and said polyamino acid is about 60 to about 40 percent by weight of said composite material.

8. A method for forming an ivory-like molded material as recited in claim 1 wherein said first pressure is about 35,000 psi to about 50,000 psi and said first temperature is about 20° C. to about 40° C.

9. A method for forming an ivory-like molded material as recited in claim 8 wherein said second pressure is about 25,000 psi to about 35,000 psi and said second temperature is no greater than about 250° C.

10. A method for forming an ivory-like molded material suitable for decorative purposes comprising the following steps:

providing a flexible container filled with a predetermined amount of a poly(amino acid)/mineral filled composite material consisting essentially of from about 25 to about 75 percent by weight of a mineral filler chosen from the group consisting of hydroxyapatite or tricalcium phosphate, and about 75 to about 25 percent by weight of an α-amino acid polymer, said mineral filler being essentially uniformly dispersed within said α-amino acid polymer, the composite formed through an in-situ polymerization of amino acids on the mineral filler;

isostatically pressurizing said poly(amino acid)/mineral filled composite material within said flexible container at a first pressure of from about 35,000 psi to about 50,000 psi and a first temperature of from about 20° C. to about 40° C., for a duration sufficient to produce a compacted green mold of said composite material; and isostatically pressurizing said green mold at a second pressure of from about 25,000 psi to about 35,000 psi and a second temperature which is no greater than about 250° C., for a duration sufficient to produce ivory-like molded pieces.

11. A method for forming an ivory-like molded material as recited in claim 10 wherein said α-amino polymer is a gamma-methyl L-glutamate polymer.

* * * * *